United States Patent
Turkot

[15] 3,687,415
[45] Aug. 29, 1972

[54] MANUALLY OPERABLE POWER ACTUATED VALVE

[72] Inventor: Matthew E. Turkot, Lombard, Ill.
[73] Assignee: Hill-McCanna Company, Carpentersville, Ill.
[22] Filed: Dec. 28, 1970
[21] Appl. No.: 101,617

[52] U.S. Cl. .....................251/89, 251/130, 251/133
[51] Int. Cl. ............................................F16k 31/05
[58] Field of Search....251/130, 133, 14, 59, 89, 134; 287/129, 130

[56] References Cited

UNITED STATES PATENTS

| | | | |
|---|---|---|---|
| 2,621,678 | 12/1952 | Snyder et al. | 251/133 X |
| 3,080,952 | 3/1963 | Carlstedt | 251/133 X |
| 3,334,859 | 8/1967 | Raymond, Jr. | 251/134 |
| 3,347,235 | 10/1967 | Hunnicutt | 251/133 X |
| 3,515,250 | 6/1970 | Cantalupo | 251/130 X |

FOREIGN PATENTS OR APPLICATIONS

| | | | |
|---|---|---|---|
| 5,084 | 1883 | Great Britain | 287/130 |

*Primary Examiner*—Arnold Rosenthal
*Attorney*—Earl T. Reichert

[57] ABSTRACT

A manually operable power actuated valve has a rotary control stem disposed in coaxial relation to a driving stem actuated by a driving motor through a speed-reducing transmission. The flatted outer end of the control stem is fitted into a noncircular opening in a first coupling disc having a periphery shaped for convenient engagement and rotation by a wrench to open and close the valve manually. A second coupling disc, nonrotatably connected to the first disc by a pair of axially extending driving studs, is axially shiftable between a retracted, disconnect position in which the control stem is freed for manual rotation by a wrench applied to the first disc and an extended, power driving position in which a noncircular opening in the second disc receives the flatted outer end of the driving stem to releasably couple the two stems for power actuation of the valve. The shiftable coupling disc is yieldably retained in its extended position by engagement of a snap ring with V-notches in the driving studs.

13 Claims, 9 Drawing Figures

Patented Aug. 29, 1972
3,687,415
2 Sheets-Sheet 1
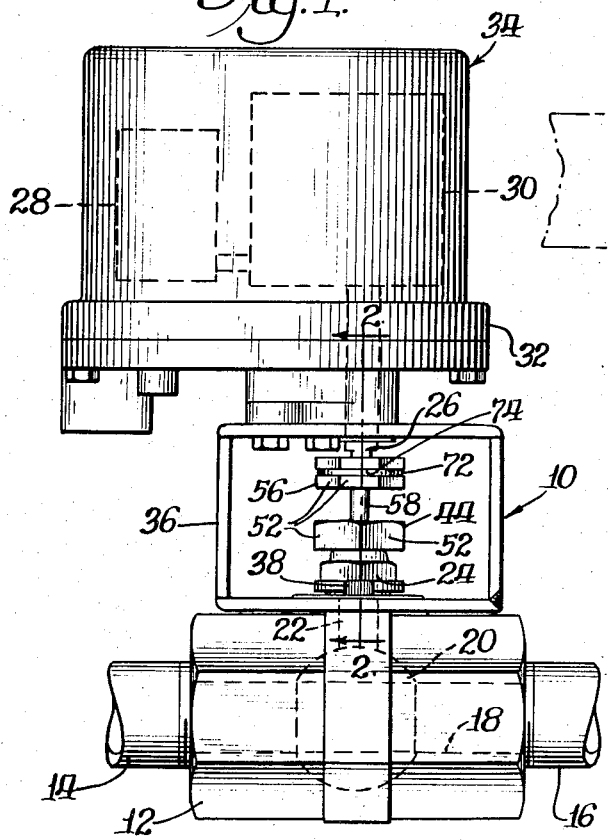
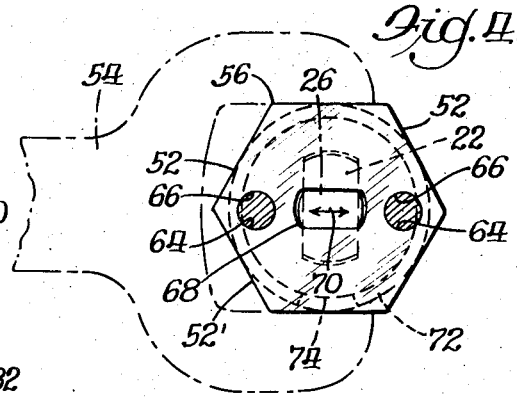
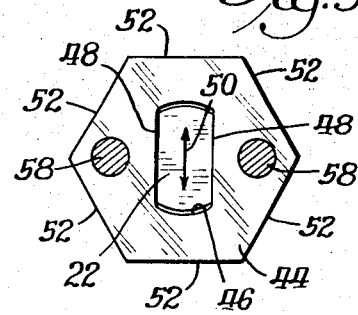
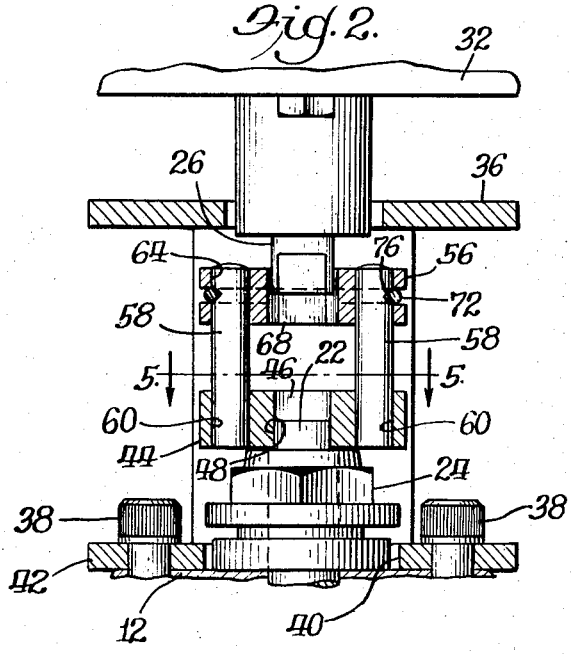
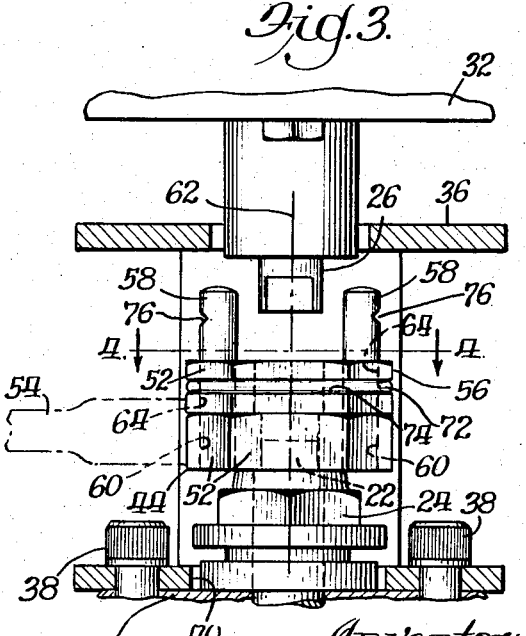
Inventor:
Matthew E. Turkot
By Burmeister, Palmatier & Hamby
Attys.

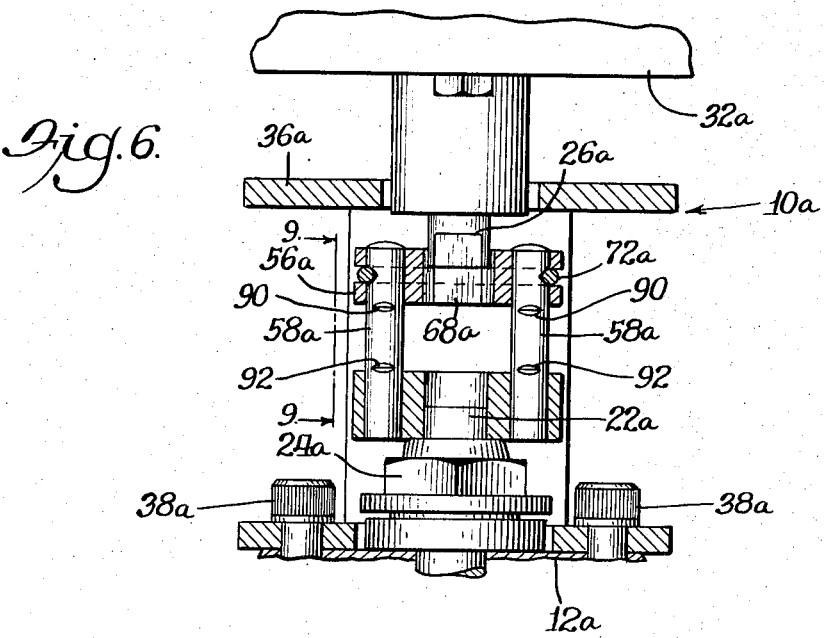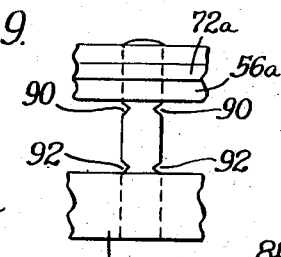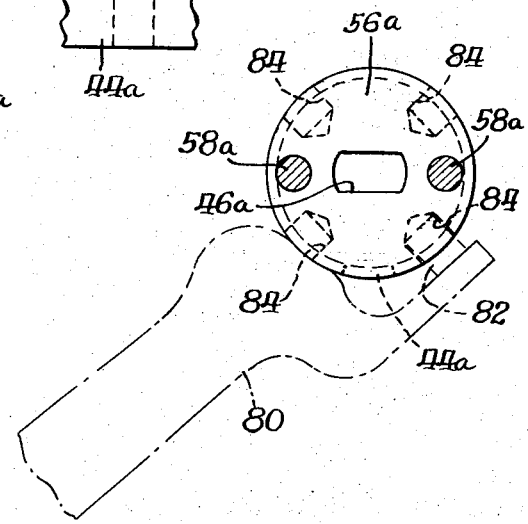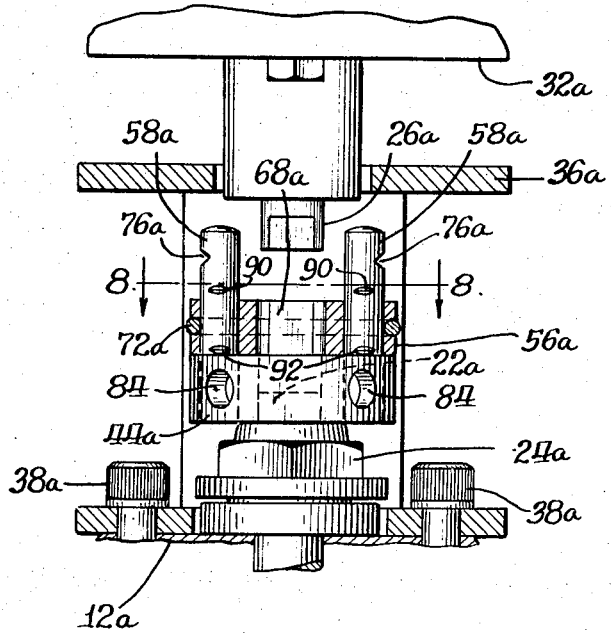

MANUALLY OPERABLE POWER ACTUATED VALVE

The present invention relates to power actuated valves which individually incorporate a motor which operates through a speed-reducing transmission to turn a flow control member within the valve between open and closed positions.

Power actuated valves of this general character afford many advantages, particularly in conjunction with remote control operating systems. Characteristically, such valves are most reliable in operation. Nevertheless, operational failures can occur due to power failures or an occasional malfunction of the power driving mechanism or associated controls.

When normal power operation of such a power actuated valve is impossible on account of a power failure or otherwise, it can be highly desirable or even essential that the valve be operated either to start or stop a flow of fluid through the valve. As an emergency procedure, such valves have been operated manually either by turning the driving motor or by turning the output end of the power drive connected with the valve control stem. Neither of these expedients has been satisfactory and have on occasion been ineffective and sometimes a cause of damage to the mechanism.

On account of the wide difference between the rather limited output torque of the driving motor which it is practical to use in such valves and the comparatively large torque required to turn the flow control member in the valve, particularly in the case of ball valves, it is highly advantageous to connect the driving motor to the flow control member by means of a transmission having a very high torque multiplying capability and incidentally correspondingly high speed reducing capabilities.

Consequently, the expedient of manually turning the driving motor or input end of the torque multiplying and speed-reducing transmission is necessarily a slow process because of the many turns required. Moreover, the torque manually applied to the driving motor end of the transmission and being possibly much higher than the maximum torque output of the driving motor is much multiplied by the speed-reducing transmission with the consequence that the valve or its operating mechanism can be rather easily damaged by such manual operation.

On the other hand, the expedient of manually turning the output end of the driving mechanism connected to the valve control shaft can be most difficult and ineffective or even impossible as a practical matter. For example, the torsional drag of electrical brushes associated with an electric driving motor can, when multiplied through the speed-reducing transmission, impose a strong negative torque or braking effect resistant to turning of the output end of the drive connected to the valve control stem. As a practical matter, the cumulative drag of this negative torque of the unenergized drive mechanism and the normal turning resistance of the flow control member within the valve can make it unfeasible to manually open or close the valve by torque manually applied to the output end of the actuating mechanism.

One object of the invention is to provide an improved power actuated valve, particularly a ball valve, of the above character which can be opened or closed quickly, in the event of failure of power operation, by manual turning force applied straight forwardly to the control stem of the valve by means of a general purpose wrench without danger of damage to the valve mechanism and without the necessity to overcome any drag or negative torque imposed by the power operating mechanism.

A further object is to provide power actuated valve structure of a compact character which can be operated manually to advantage by a general purpose wrench applied to driving structure carried by the valve control stem and being specially shaped for direct engagement and rotation by a general purpose wrench and being selectively operable to free the valve stem for manual rotation by a wrench without drag from the power driving mechanism or to turn the control stem in the normal manner by the power driving mechanism.

Another object is to provide a power actuated valve in which selective operation of the valve either by power through a power drive or manually by means of a wrench or the like with the power drive disconnected is provided by a collapsible coupling that can be readily lifted, when collapsed, free of the coacting valve control stem to provide access to the vicinity of the valve stem for servicing the valve, as by tightening or replacing the valve stem seal.

Another object is to provide for valves power actuating means of new and improved construction that universally accommodates misalignment between a valve stem and a drive stem therefor while at the same time providing for turning of the valve stem either by power transmitted through the drive stem or manually by means of a wrench or the like with the drive stem disconnected to avoid drag.

Another object is to achieve the foregoing objects by means of new and improved valve actuating structure that also protects the power driving means for actuating the valve and the valve itself from damage from torque overloads in the event the valve becomes stuck or "frozen" against opening or closing movement.

A further object is to provide power actuated valve control means which facilitates direct turning of the valve control stem by means of a wrench without drag from the power operating mechanism and which has a most rugged and reliable construction which is well adapted for economical manufacture.

Other objects and advantages will appear from the following description of the exemplary embodiment of the invention illustrated in the accompanying drawings, in which:

FIG. 1 is an elevational view of a power actuated ball valve incorporating the invention, some major internal components being outlined schematically in dotted lines;

FIG. 2 is a vertical sectional view on an enlarged scale taken along the line 2—2 of FIG. 1 and illustrating the normal positional relationship occupied by components of the valve when conditioned for power actuation;

FIG. 3 is a view similar to FIG. 2 but illustrating the positional relationship of the parts when repositioned for rotation of the valve control stem by turning force applied by a wrench without drag from the power driving mechanism;

FIG. 4 is a transverse sectional view taken with reference to the line 4—4 in FIG. 3 and illustrating in phantom the application of a wrench, which also appears in phantom in FIG. 3, for turning the valve control stem;

FIG. 5 is a transverse sectional view taken with reference to the line 5—5 of FIG. 2;

FIG. 6 is a vertical sectional view similar to FIG. 2 but showing a modified construction adapted for manual rotation of the valve control stem by a spanner wrench;

FIG. 7 is a view similar to FIG. 6 but showing the coupling structure retracted for manual operation of the control stem;

FIG. 8 is a sectional view taken with reference to the line 8—8 of FIG. 7 and showing a spanner wrench engaging the control stem drive structure for manual operation of the valve; and FIG. 9 is a fragmentary elevational view taken with reference to the line 9—9 of FIG. 6.

Having reference to the drawings in greater detail, the manually operable power actuated valve 10 forming the exemplary embodiment of the invention illustrated in FIGS. 1 to 5 comprises a valve body 12 adapted for connection between coacting conduits 14, 16 and defining an internal flow passage 18 which is opened and closed selectively by a rotatable valve ball 20 constituting a flow control member.

The flow control ball 20 is turned between open and closed positions to open and close the passage 18 by means of a control stem 22, FIGS. 2, 3 and 5, extending laterally from the valve body 12 through stem sealing structure 24.

Normally, the control stem 22 is rotated to open and close the valve by means of a driving stem 26 disposed in coaxial relation to the control stem 22 as shown in FIGS. 1, 2 and 3.

The driving stem 26 is turned by an electric driving motor 28 connected through a speed-reducing and torque-multiplying transmission 30 with the driving stem as depicted schematically in phantom lines in FIG. 1. The valve driving motor 28 and transmission 30 are housed, as shown, within an actuator casing 32 which journals the driving stem 26 extending from the transmission 30 through the bottom of the casing 32 as shown in the drawings.

The power actuator 34 formed by the driving motor 28, transmission 30 and driving stem 26 housed within and supported by the casing 32 is an integral part of the valve 10, the actuator casing 32 being fixedly secured to the valve body 12 as by a bracket 36. In this instance, the bracket 36 is a four-sided bracket having two opposite sides open. The bracket is bolted to the underside of the casing 32 and secured by screws 38 to the valve housing 12 in such manner that the valve control stem 22 and the stem sealing structure 24 project upwardly through a central aperture 40, FIG. 2, in a lower plate or panel 42 of the bracket 36.

For a more complete disclosure of a valve driving motor, torque-multiplying transmission, and associated controls such as may be incorporated in the actuator casing 32, reference may be made to U.S. Pat. No. 3,334,859 issued Aug. 8, 1967 to Frank J. Raymond, Jr.

A first coupling disc 44 adapted, as will presently appear, for turning the control stem 22 either manually by means of a wrench applied directly to the coupling disc 44 or by power supplied through the transmission 30 from the driving motor 28 is mounted on the outer end of the control stem 22 to turn the control stem.

To provide the desired rotary driving connection with the coupling disc 44, the outer end of the control stem 22 is fashioned to have a noncircular shape, the outer end of the stem being flatted on opposite sides as shown in FIGS. 2 and 5 to have an elongated shape in transverse section.

The coupling disc 44 defines a central opening 46 shaped to receive the flatted outer end of the control stem 22 and having opposite sides slidably engaging generally parallel driving surfaces 48 on opposite sides of the stem 22. The coupling disc opening 46 has a long dimension in axial section shown in FIG. 5 which exceeds the corresponding lateral dimension of the control stem 22 to provide between the control stem 22 and the two radial ends of the opening 46 clearance or play which allows radial sliding movement of the coupling disc 44 relative to the control stem 22 in the direction of the double-ended arrow 50 shown in FIG. 5, while at the same time precluding any material rotary movement of the coupling disc 44 relative to the stem 22. The function of the clearance which allows relative radial movement in the direction of the double-ended arrow 50 in accommodating any mutual misalignment of the control stem 22 and driving stem 26 will appear later.

As shown best in FIGS. 1 and 5, the periphery of the coupling disc 44 is shaped in the form of a hexagon with three pairs of mutually parallel side surfaces 52 angularly spaced circumferentially around the disc 44 for convenient engagement with the jaws of a wrench 54, shown schematically in phantom lines in FIGS. 3 and 4, which can be inserted through the open sides of the bracket 36 to engage the coupling disc 44, which has as described the overall form of a "hex nut."

A shiftable coupling disc 56 is continuously connected to the coupling disc 44 by a pair of strong cylindrical studs 58 anchored securely in axial bores 60 formed in the coupling disc 44 on diametrically opposite sides of the common axis 62, FIG. 3, of the control stem 22 and driving stem 26. The two driving studs 58 project axially away from the valve housing 12 in parallel relation to each other and extend slidably through two cylindrical bores 64 formed in the shiftable disc 56 on diametrically opposite sides of the common stem axis 62. The sidewalls of the bores 64 define driving surfaces 66 which engage the projecting studs 58 to hold the disc 56 against rotation relative to the disc 44 and serve to transmit torque from the disc 56 to the disc 44 while allowing shifting movement of the disc 56 from the retracted, disconnect position illustrated in FIG. 3 to the extended power driving position shown in FIGS. 1 and 2.

When shifted to its power driving or active coupling position illustrated in FIGS. 1 and 2, the coupling disc 56 axially overlaps the outer end of the driving stem 26 which has a flatted noncircular shape and is accommodated within a noncircular central opening 68 of similar shape formed centrally within the coupling disc 56.

The fit of the flatted outer end of the driving stem 26 within the noncircular coupling disc opening 68 is such that material rotation of the disc 56 relative to the driving stem 26 is precluded when the coupling disc is in its extended driving position. The opening 68 and the interfitting outer end of the driving stem 26 have an elongated shape in transverse section as shown in FIG. 4, the transverse direction of elongation of the opening 68 being oriented approximately at right angles to the corresponding direction of elongation of the opening 46 within coupling disc 44.

Moreover, the opening 68 is elongated transversely in relation to the corresponding width of the driving stem 26 to allow radial movement of the disc 56 relative to the driving stem 26 in the direction of the double-ended arrow 70 shown in FIG. 4 and oriented at right angles to the direction of permissible radial movement of the disc 44 relative to the control stem 22 illustrated by the double-ended arrow 50 in FIG. 5.

The shiftable coupling disc 56 is yieldably retained in its extended power driving position which axially overlaps the driving stem 26 by means of a snap ring 72 accommodated within a peripheral groove 74 in the coupling disc 56 so that the snap ring yieldably engages outwardly facing V-notches 76 in the projecting studs 58 when the disc 56 is shifted into its coupling position shown in FIGS. 1 and 2. When shifted to its retracted position illustrated in FIG. 3, the coupling disc 56 clears the noncircular outer end of the driving stem 26, the stem 26 being axially spaced from the disc 44 sufficiently to accommodate the disc 56 therebetween as illustrated in FIG. 3.

The outer periphery of the shiftable coupling disc 56 is shaped and dimensioned similarly to the coupling disc 44 so that upon retraction of the disc 56 its periphery forms an extension of the wrench-engaging flats 52 of the disc 56, the surface continuations on the disc 56 being denoted by the numbers 52 in FIG. 4. As a consequence, the coupling discs 44 and 56 together form upon retraction of the disc 56 a continuous "hex nut" adapted for ready engagement and manual rotation by a general purpose wrench 54 for emergency opening or closing of the valve 10.

Normally, the coupling disc 56 remains in its extended position overlapping the driving stem 26 which enables the drive motor 28, which can be operated to advantage from a remote control station, to work through the torque-multiplying transmission 30 to selectively open and close the valve. The capability of the upper coupling disc 56 to slide radially relative to the driving stem 26 in the direction of the double-ended arrow 70, FIG. 4, together with the concurrent ability of the coupling disc 44 to slide radially relative to the control stem 22 in the direction of the double-ended arrow 50, FIG. 5, which is normal to the arrow 70, enables the mechanism as a whole to accommodate misalignment of the generally coaxial stems 22, 26. In the event of an operational failure of the power driving mechanism due to a power failure or otherwise, it is necessary only to shift the disc 56 to its retracted position using any suitable instrument or even the hand of the attendant for this purpose whereupon a wrench 54 is applied to the two adjacent discs 44, 56 through the open side of the bracket 36 to effect manual turning of the flow control member 20.

To gain convenient access to the vicinity of the valve control stem 22 for servicing the stem sealing structure 24 or for any other purpose such as may arise, it is necessary only to simply lift the two coupling discs 44, 56, in their collapsed condition with respect to each other, FIG. 3, off the outer end of the control stem 22 and away from both the control stem 22 and the driving stem 26 through space intervening between the outer ends of the two stems.

As best illustrated in FIGS. 2 and 3, the spacing between the outer end of the control stem 22 and the outer end of the driving stem 26 exceeds the combined thickness of the two coupling discs 44, 56 so that when the coupling discs are collapsed together as shown in FIG. 3 they can be moved laterally out of intervening relation between the two stems 22, 26 after having first been shifted axially to clear the projecting ends of both stems.

After servicing of the valve in the vicinity of the control stem 22 has been completed, the collapsed coupling discs 44, 56 together with the studs 58 and detent rings 72 are simply lifted back onto the control stem 22 whereupon the disc 56 can be shifted back into overlapping driven relation to the driving stem 26 if desired.

In the modified construction illustrated in FIGS. 6 to 8, component elements corresponding to those previously described in relation to the valve 10 of FIGS. 1 to 5 are denoted with the same reference numbers with the addition of the suffix "a."

In the valve 10a, the lower coupling disc 44a is fashioned and adapted for convenient engagement and rotation by a spanner wrench 80 such as that illustrated for example in phantom in FIG. 8. The outer periphery of the coupling disc 44a is generally circular or cylindrical as shown.

To receive the grip of a spanner wrench 80 having one or more prongs or tines 82, FIG. 8, a plurality of circumferentially spaced prong-receiving bores 84 are formed in the periphery of the disc 44 to open radially outward. In the construction shown, two pairs of diametrically spaced bores or recesses 84 are formed in the disc 44a. The shiftable coupling disc 56a has a circular shape and size diametrically conforming to the cylindrical shape and size of the disc 44a.

In the event the valve becomes stuck or "frozen" against opening or closing movement by torque within limits which can be withstood by the valve and its power actuating structure without damage, the valve and its power drive are protected from damage by torque overloads by the structure which selectively connects the driving stem 26a to the control stem 22a and which serves as explained to receive a turning lever or tool used to turn the valve manually with the power drive disconnected as shown in FIG. 7.

In the event of incipient torque overloads on the valve control structure incident to sticking or "freezing" of the valve against opening or closing movement, the two driving studs 58a extending between the coupling disc 44a and the extended coupling disc 56a give way under the excessive load to allow continued normal turning of the driving stem 26a without damage to the power drive for the valve or the valve itself even though the control stem 22a remains stuck against rotary movement.

In the construction best illustrated in FIGS. 6, 7 and 9, a controlled safety response of the studs 58a to incipient torque overloads is facilitated in the design of the studs by scoring of each stud on opposite sides by a pair of notches 90 located adjacent the position occupied by the inner face of the coupling disc 58a when the latter is in its extended position, FIG. 6, and by a pair of notches 92 located adjacent the upper or inner face of the coupling disc 44a, the notches 90, 92 being located as shown in those portions of the stud structure where the stresses incident to the transmission of valve actuating torque tend to be the greatest.

The driving studs 58a can be fashioned to advantage from a metal having an appropriate degree of brittleness so that the driving studs break off in response to excessive torque loads to sharply release the valve actuating structure from torque loads, thus affording maximum protection to coacting structure from damage from excessive torque overloads and facilitating, in, some instances at least, detection of the nonresponsive condition of the valve.

The invention is claimed as follows:

1. A power actuated valve selectively operable manually and comprising a valve body defining a flow passage therethrough, a flow control member movably disposed in said body for opening and closing said passage, a rotary control stem connected to said flow control member to actuate the latter and extending from said body, a rotary driving stem, means supporting said driving stem in coaxial relation to said control stem, a valve actuating motor, a speed-reducing transmission connecting said motor to rotate said driving stem, a first coupling member secured nonrotatably to the outer end of said control stem in driving relation thereto, a shiftable coupling member shiftable axially along the common axis of said stems between a retracted disconnect position adjacent said first coupling member and an extended power driving position spaced from said disconnect position and axially overlapping the outer end of said driving stem, the outer end of said driving stem having a noncircular shape in transverse section, said shiftable coupling member having a noncircular recess therein for receiving the outer end of said driving stem when the shiftable coupling member is in said extended power driving position thereof to form a separable driving connection between said driving stem and said shiftable coupling member, one of said coupling members defining thereon a plurality of driving surfaces, the other of said coupling members having thereon a plurality of driving projections extending axially into overlapping relation to said driving surfaces on said one coupling member when said shiftable coupling member is in its extended driving position to transmit driving torque between said coupling members, and one of said coupling members defining wrench-engaging surfaces shaped for coaction with a removable wrench for manual turning of said control stem independently of said driving stem when said shiftable coupling member is shifted to its retracted disconnect position.

2. A power actuated valve according to claim 1 including detent means on said shiftable coupling member coacting with one of said projections to releasably hold said shiftable coupling member in its extended power driving position.

3. A power actuated valve according to claim 1 in which the periphery of said first coupling member is shaped to define a plurality of pairs of parallel wrench-engaging surfaces accessible for wrench engagement for manual turning of said control stem when said shiftable coupling member is in its retracted disconnect position.

4. A power actuated valve according to claim 3 in which the periphery of said shiftable coupling member conforms in size and shape to the periphery of said first coupling member so that the shiftable coupling member when shifted to its retracted position forms continuations of said wrench-engaging surfaces on said first coupling member.

5. A power actuated valve according to claim 1 in which the periphery of said first coupling member is shaped to define a plurality of circumferentially spaced spanner wrench-receiving bores.

6. A power actuated valve selectively operable manually and comprising a valve body defining a flow passage therethrough, a flow control member movably disposed in said body for opening and closing said passage, a rotary control stem connected to said flow control member to actuate the latter and extending from said body, the outer end of said control stem defining on opposite sides thereof flat parallel driving surfaces, a first coupling member internally shaped to fit slidably against said flat driving surfaces to form a rotary driving connection between said first coupling member and said control stem and to allow limited radial displacement of the coupling member relative to the control stem in parallel relation to said driving surfaces, said coupling member defining a pair of stud bores parallel to the axis of said control stem and located generally on diametrically opposite sides of said axis, a pair of driving studs anchored in said stud bores and projecting from said coupling member in parallel relation to said control stem axis, a rotary driving stem, means supporting said driving stem in coaxial relation to said control stem, a valve actuating motor, a speed-reducing transmission connecting said motor to rotate said driving stem, a shiftable coupling member defining bores slidably receiving said driving studs and being shiftable therealong between a retracted disconnect position adjacent said first coupling member and an extended power driving position spaced from said disconnect position and axially overlapping the outer end of said driving stem, the outer end of said driving stem defining on opposite sides thereof flat parallel driving surfaces, said shiftable coupling member being internally shaped to fit slidably against the flat driving surfaces on the outer end of said driving stem and form a rotary driving connection with the driving stem when the shiftable coupling member is in said extended power driving position and the flat driving surfaces on the driving stem are positioned generally at right angles to the flat driving surfaces on the control stem, said shiftable coupling member being internally shaped to provide clearance for radial sliding movement of the shiftable coupling member relative to the driving stem in parallel relation to said driving surfaces thereon, and one of said coupling members defining wrench-engaging surfaces shaped for coaction with a removable wrench for manual turning of said control stem independently of said driving stem when said shiftable coupling member is shifted to its retracted disconnect position.

7. A power actuated valve according to claim 6 comprising a snap ring fitted in a circumferential groove formed in the periphery of said shiftable coupling member and intersecting said stud-receiving bores in the shiftable coupling member, said driving studs defining therein notches opening radially outwardly and positioned to receive said snap ring to yieldably hold said shiftable coupling member in its extended power driving position.

8. A power actuated valve selectively operable manually and comprising a valve body defining a flow passage therethrough, a flow control member movably disposed in said body for opening and closing said passage, a rotary control stem connected to said flow control member to actuate the latter and extending from said body, a rotary driving stem, means supporting said driving stem in coaxial relation to said control stem, a valve actuating motor, a speed-reducing transmission connecting said motor to rotate said driving stem, a first coupling member secured nonrotatably to the outer end of said control stem in driving relation thereto, a shiftable coupling member shiftable axially along the common axis of said stems between a retracted disconnect position adjacent said first coupling member and an extended power driving position spaced from said disconnect position and axially overlapping the outer end of said driving stem, the outer end of said driving stem having a noncircular shape in transverse section, said shiftable coupling member having a noncircular recess therein for receiving the outer end of said driving stem when the shiftable coupling member is in said extended power driving position thereof to form a separable driving connection between said driving stem and said shiftable coupling member, a plurality of substantially cylindrical driving studs fixed to one of said coupling members and extending therefrom in parallel relation to the common axis of said stems, the other of said coupling members defining a plurality of bores slidably receiving said respective studs to transmit driving torque between said coupling members when said shiftable coupling member is in either its extended position or its retracted position, and one of said coupling members defining wrench-receiving surfaces shaped for manual wrench rotation of said control stem independently of said driving stem when said shiftable coupling member is shifted to its retracted disconnect position.

9. Valve control means for operating a valve selectively by power or manually, comprising a first rotary coupling member defining therein a control stem receiving recess of noncircular shape that is elongated in a predetermined transverse direction, said coupling member defining a pair of stud bores parallel to the axis of rotation of said control stem and located generally on diametrically opposite sides thereof, a pair of driving studs anchored in said stud bores and projecting from said coupling member in parallel relation to said axis of rotation thereof, a rotary driving stem, means supporting said driving stem in generally coaxial relation to said axis of rotation of said coupling member, a valve actuating motor, a speed-reducing transmission connecting said motor to rotate said driving stem, a shiftable coupling member defining bores slidably receiving said driving studs and being shiftable therealong between a retracted disconnect position adjacent said first coupling member and an extended power driving position spaced from said disconnect position and axially overlapping the outer end of said driving stem, the outer end of said driving stem defining on opposite sides thereof flat parallel driving surfaces, said shiftable coupling member being internally shaped to fit slidably against the flat driving surfaces on the outer end of said driving stem and form a rotary driving connection with the driving stem when the shiftable coupling member is in said extended power driving position and the flat driving surface on the driving stem are positioned generally at right angles to said predetermined transverse direction of elongation of said recess in said first coupling member, said shiftable coupling member being internally shaped to provide clearance for radial sliding movement of the shiftable coupling member relative to the driving stem in parallel relation to said driving surfaces thereon, and one of said coupling members defining wrench-engaging surfaces shaped for coaction with a removable wrench for manual turning of said coupling members independently of said driving stem when said shiftable coupling member is shifted to its retracted disconnect position.

10. Valve control means according to claim 9 comprising a snap ring supported in a circumferential groove formed in the periphery of said shiftable coupling member and intersecting said stud-receiving bores in the shiftable coupling member, said driving studs defining therein notches opening radially outwardly and positioned to receive said snap ring to yieldably hold said shiftable coupling member in its extended power driving position.

11. Valve control means for operating a valve selectively by power or manually, comprising a rotary driving stem, a valve actuating motor, a speed-reducing transmission connecting said motor to rotate said driving stem, a first coupling member rotatable about the axis of said driving stem in spaced relation to said driving stem, said first coupling member having thereon valve control stem driving means, a shiftable coupling member shiftable axially along the axis of said driving stem between a retracted disconnect position adjacent said first coupling member and an extended power driving position spaced from said disconnect position and axially overlapping the outer end of said driving stem, the outer end of said driving stem having a noncircular shape in transverse section, said shiftable coupling member including a noncircular element for coacting with the noncircular outer end of said driving stem when the shiftable coupling member is in said extended power driving position thereof to form a separable driving connection between said driving stem and said shiftable coupling member, one of said coupling members defining thereon a plurality of driving surfaces, the other of said coupling members having thereon a plurality of driving elements extending axially into overlapping relation to said driving surfaces on said one coupling member when said shiftable coupling member is in its extended driving position to transmit driving torque between said coupling members, one of said coupling members defining wrench-receiving surfaces shaped for manual wrench rotation of said first coupling member independently of said driving stem when said shiftable coupling member is shifted to its retracted disconnect position, and detent means on said shiftable coupling member coacting with one of said driving elements to releasably hold said shiftable coupling member in its extended power driving position.

12. A power actuated valve selectively operable manually and comprising a valve body defining a flow passage therethrough, a flow control member movably disposed in said body for opening and closing said passage, a rotary control stem connected to said flow control member to actuate the latter and extending from said body, a rotary driving stem supported in proximate relation to said control stem, a valve actuating motor connected to rotate said driving stem, a first coupling member secured nonrotatably to said control stem in driving relation thereto, a shiftable coupling member shiftable between a disconnect position and a power driving position spaced from said disconnect position, said driving stem and said shiftable coupling member having means thereon mutually coacting to establish when said shiftable coupling member is in said power driving position thereof a separable driving connection between said driving stem and said shiftable coupling member that is broken upon shifting of the shiftable coupling member to said disconnect position thereof, means on said first coupling member and said shiftable coupling member mutually coacting to transmit torque therebetween when said shiftable coupling member is in said power driving position thereof, one of said coupling members defining tool-engaging surfaces shaped for coaction with a removable tool for manual turning of said control stem independently of said driving stem when said shiftable coupling member is shifted to its disconnect position, wherein said first coupling member and said shiftable coupling member are mutually interconnected to preclude relative rotation and to transmit torque therebetween by a plurality of studs mounted in one of said coupling members and extending into slidable overlapping relation to the other of said members even when said shiftable coupling member is in its power driving position, said studs defining therein stress focusing recesses located proximate to one of said coupling members when said shiftable coupling member is in its power driving position to limit the bending load bearing capacity of the studs and thereby release the driving stem for continued turning when torsional resistance to turning of the control stem exceeds a predetermined safety limit.

13. A power actuated valve selectively operable manually and comprising a valve body defining a flow passage therethrough, a flow control member movably disposed in said body for opening and closing said passage, a rotary control stem connected to said flow control member to actuate the latter and extending from said body, a rotary driving stem supported in proximate relation to said control stem a valve actuating motor connected to rotate said driving stem, a first coupling member secured nonrotatably to said control stem in driving relation thereto, a shiftable coupling member shiftable between a disconnect position and a power driving position spaced from said disconnect position, said driving stem and said shiftable coupling member having means thereon mutually coacting to establish when said shiftable coupling member is in said power driving position thereof a separable driving connection between said driving stem and said shiftable coupling member that is broken upon shifting of the shiftable coupling member to said disconnect position thereof, means on said first coupling member and said shiftable coupling member mutually coacting to transmit torque therebetween when said shiftable coupling member is in said power driving position thereof, one of said coupling members defining tool-engaging surfaces shaped for coaction with a removable tool for manual turning of said control stem independently of said driving stem when said shiftable coupling member is shifted to its disconnect position, wherein rotation of said shiftable coupling member relative to said first coupling member is precluded by driving elements carried by one of said coupling members and extending into slidable overlapping relation to the other of said coupling members, said driving elements defining detent notches therein, the other of said coupling members carrying a biased retaining element coacting with said detent notches when said shiftable coupling member is in said power driving position thereof to releasably hold said shiftable coupling member against displacement from said power driving position.

* * * * *